United States Patent [19]
Cornett et al.

[11] Patent Number: 5,491,494
[45] Date of Patent: Feb. 13, 1996

[54] PICK CORRELATION

[75] Inventors: Kevin B. Cornett, Wappingers Falls; Edward F. Mark, Poughkeepsie, both of N.Y.

[73] Assignee: International Business Machines Corporation, Armonk, N.Y.

[21] Appl. No.: 155,962

[22] Filed: Nov. 19, 1993

[51] Int. Cl.$^6$ .................................................. G09G 5/00
[52] U.S. Cl. ........................... 345/118; 345/145; 395/134
[58] Field of Search .................................. 395/134, 143; 382/41, 48; 345/118, 145

[56] References Cited

U.S. PATENT DOCUMENTS

| | | | |
|---|---|---|---|
| 4,070,710 | 1/1978 | Sukonick et al. | 364/900 |
| 4,698,625 | 10/1987 | McCaskill et al. | 340/709 |
| 4,751,507 | 6/1988 | Hama et al. | 340/724 |
| 4,847,605 | 7/1989 | Callahan et al. | 345/145 |
| 4,941,111 | 7/1990 | Sfarti | 364/521 |
| 4,958,147 | 9/1990 | Kanema et al. | 340/706 |
| 4,982,345 | 1/1991 | Callahan et al. | 364/521 |
| 5,012,433 | 4/1991 | Callahan et al. | 395/134 |
| 5,027,291 | 6/1991 | Callahan et al. | 364/521 |
| 5,079,719 | 1/1992 | Maillot | 395/134 |
| 5,185,597 | 2/1993 | Pappas et al. | 340/709 |
| 5,202,671 | 4/1993 | Aranda et al. | 340/747 |
| 5,231,695 | 7/1993 | Harrington | 395/134 |
| 5,231,696 | 7/1993 | Roux et al. | 395/134 |

OTHER PUBLICATIONS

"Computer Graphics—Principles and Practice" by Foley, vanDam, Feiner and Hughes, Second Edition 1990, Published by Addison Wesley, see specifically, pp. 48–50, 338–339, 111–124 and 925–928.

"Computer Organization and Architecture, Principles of Structure and Function", Second Edition, Macmillan Publishing Company, pp. 276–283.

"Design of the IBM RISC System/6000 Floating Point Execution Unit", by R. K. Montoye et al., IBM Journal of Research and Development vol. 34, No. 1, Jan. 1990, pp. 59–70.

Duvanenko et al. (Dr. Dobbs Journal, Jul., 1990, pp. 36–45, 98, 100) entitled "Improving Line Segment Clipping".

The Nicholl, et al., "An Efficient New Algorithm for 2–D Line Clipping: Its Development and Analysis" ACM, Computer Graphics, vol. 21, No. 4, Jul. 1987, pp. 253–262.

Mielke, Bruce, Integrated Computer Graphics, West Publishing Co., NY, 1991, pp. 56,57.

Primary Examiner—Ulysses Weldon
Attorney, Agent, or Firm—Richard Lau; Kris V. Srikrishnan

[57] ABSTRACT

A pick correlation method, comprises the steps of displaying a pick marker on a display screen; directing the pick marker at an image on the display screen, the image comprising at least one line primitive, and the pick marker having a pick window corresponding thereto; subjecting the at least one line primitive to a trivial test, whereby the at least one line primitive can be trivially tested by the trivial test if the at least one line primitive has both of its end-points outside of the same extended edge of the rectangular shaped pick window and, if successfully tested by the trivial test, accepting or rejecting the at least one line primitive in accordance with the results of the trivial test; and if the at least one line primitive cannot be trivially tested, subjecting the at least one line primitive to a non-trivial test which does not require performing floating point operations, and accepting or rejecting the at least one line primitive in accordance with the results of the non-trivial test.

7 Claims, 4 Drawing Sheets

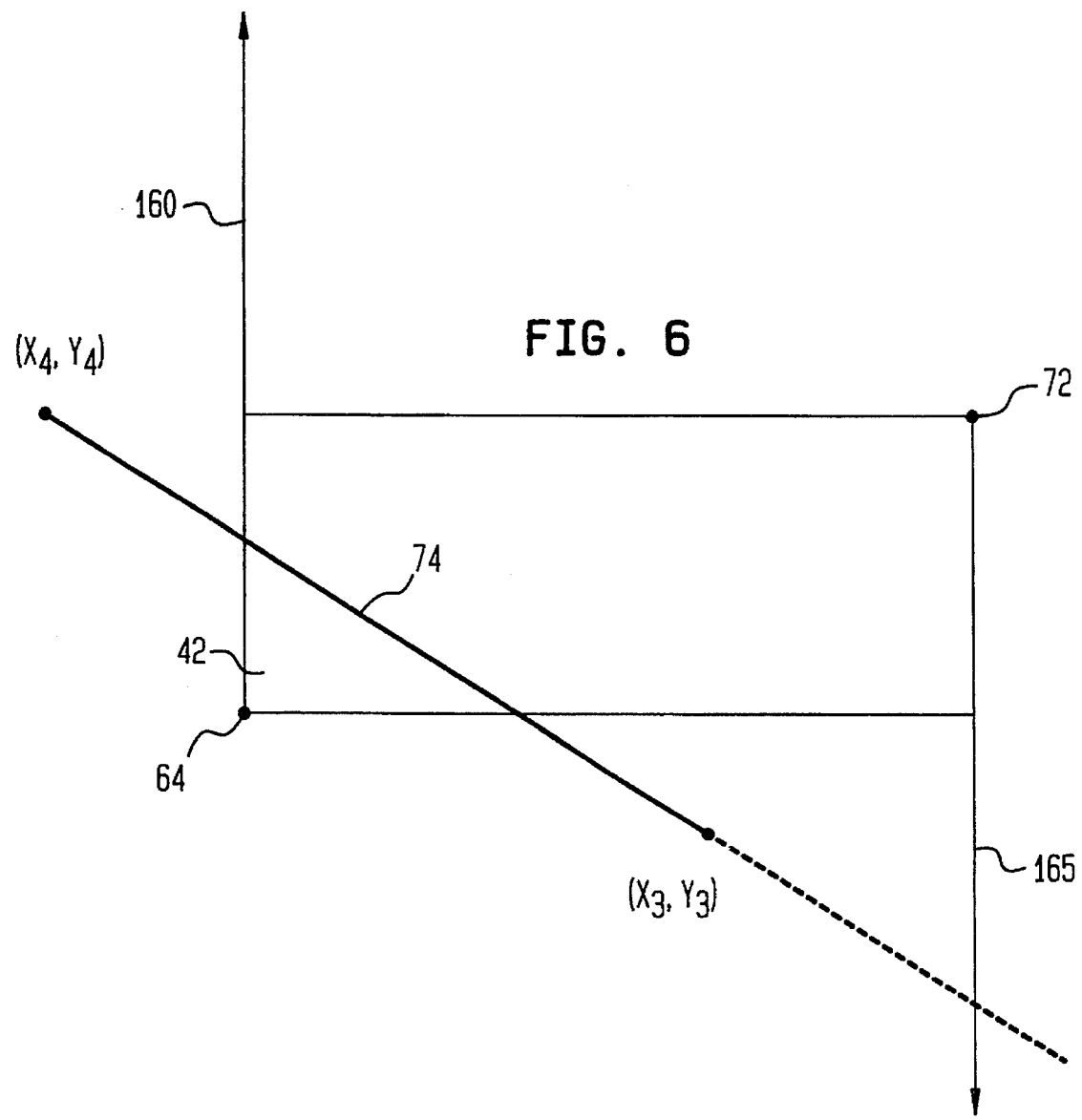

PICK CORRELATION

FIELD OF THE INVENTION

The present invention relates generally to graphic display systems and, more specifically, to a graphic display system which allows for picking an object from a display screen.

BACKGROUND OF THE INVENTION

Computer graphic images are often made up of line primitives. Line primitives can represent many types of objects in computer graphic systems. Such objects can be, for example, electrical, mechanical, chemical, architectural, or artistic in nature. Most graphic systems represent the object on the display screen by a set of data which represents the coordinates of the line primitives. For example, in a two-dimensional display, these coordinate data sets are sets of values, such as $x_1, y_1; x_2, y_2$; etc., which represent each end-point x-y coordinate location of each line primitive contained in the display; more specifically, the coordinate data $x_1, y_1$ corresponds to one end-point of a line primitive, and the companion coordinate data $x_2, y_2$ corresponds to the other end-point of the same line primitive. The quantity of line primitives representing the images on a display screen can be extraordinarily large depending on the number and complexity of objects being displayed. Typically, in design systems, the quantity of line primitives corresponding to the objects shown on a display screen can at any given time range from thousands to hundreds of thousands.

Selecting an object on a screen is commonly referred to as "picking". The picking of an object is generally enabled using a pick marker to select the object on the displayed image. The pick marker used in display systems can take the form of any symbol, such as an arrow, star, polygon, rectangle, line etc.; and a user can move the pick marker about a display screen by various means, such as using a "mouse", light pen, keypad, etc. "Pick correlation" refers to the task of determining if the pick marker has a "hit" on, or has picked, a line primitive (and thus the object to which the line primitive corresponds) in the displayed image.

Currently, two methods are used for pick correlation, the so-called analytical method and the so-called clipping method. An example of an analytical method is disclosed in U.S. Pat. No. No. 4,698,625, to McCaskill et al. which relates to a technique for facilitating the selection of a graphic object on a display screen by a user. When a pointing cursor is brought to within a predetermined distance of a graphic object, the point on the graphic object closest to the pointing cursor is highlighted to show that the graphic object would be selected if the select button is depressed. If the user then depresses the select button, the entire graphic object is highlighted to indicate that it has been selected.

In contrast to analytical methods, clipping methods generally utilize a pick correlation approach whereby a window or an aperture is made to correspond to a pick marker. Such a window or aperture is referred to as a pick window or pick aperture. The pick window used in clipping methods may sometimes be invisible to a user. Typically, the clipping method rejects each line primitive in a display which does not have at least a portion within, or at least touching or in contact with, the pick window. The line primitive is clipped against the edges or boundaries which define the pick window, i.e., an evaluation is made to determine the intersection between the line primitive and the edges of the pick window, and if the clipping results in at least a portion of the line primitive determined as being within, or at least touching or contacting, the pick window (such line primitive being regarded as being "visible" within the pick window), then the line primitive is picked or accepted.

In order to outline the difficulties of pick correlation, reference is now made to FIG. 1. A rectangular pick window 10, and four line primitives having end-points labelled as AB, CD, EF and GH, are shown. It can be seen that both end-points of line primitive AB are within the pick window 10; one end-point C of line primitive CD is within the pick window 10 and the other end-point D is outside the pick window 10; and both end-points of line primitives EF and GH are outside the pick window 10. Using well known methods of clipping, such as the Cohen-Sutherland method outlined hereinbelow, line primitives which either have both of its end-points or one of its end-points within or contacting the pick window 10 can be trivially accepted, such as line primitive CD and line primitive AB. In other words, the conclusion for either line primitive CD or line primitive AB being within the pick window 10 can be relatively easily derived using conventional techniques. However, the pick decision for line primitives which have both of its end-points outside of the pick window 10, such as line primitives EF and GH, is a difficult determination and typically involves extensive, time-consuming computations.

Several prior art pick correlation methods are discussed in the textbook "Computer Graphics—Principles and Practice" by Foley, vanDam, Feiner and Hughes, Second Edition, 1990, Published by Addison Wesley, see specifically, pp. 48–50, 338–339, 111–124 and 925–928.

A basic line pick correlation technique, referred to herein as the "brute force" method, allows for testing of all line primitives, trivial and non-trivial cases. In the brute force method, line primitives are tested against each edge of the pick window by simultaneously solving line equations. More specifically, a rectangular pick window, for example, can be described by four line equations, wherein each line equation corresponds to an edge of the pick window. The equation of each pick window edge and the equation of the line primitive are simultaneously solved for determining if common intersect points exist. The intersect points are then tested to determine if they are visible within the pick window, and the line primitive can thus be accepted or rejected. The brute force method requires performing several mathematical operations, including multiplication, division and comparison, for each pick window edge/line primitive pair. The task of testing thousands of line primitives can be substantial and time-consuming even for a computer; and, in order to speed up division and multiplication operations, complicated and expensive processors capable of performing floating point operations, as opposed to simpler fixed point operations, are required. In this regard, implementing fixed point operations, and avoiding floating point operations, generally leads to a simpler and more efficient implementation. Regardless of the particular platform being used, floating point operations are inherently more expensive than fixed point operations. More particularly, floating point numbers have two components that need to be considered, an mantissa and an exponent, as opposed to fixed point numbers which can be exactly represented in a single entity. Further, in contrast to fixed point operations, floating point operations require rounding operations to minimize the inaccuracies inherent in floating point calculations. For example, floating point multiplication involves not only multiplication of the mantissas, but also addition of the exponents; and floating point addition requires three distinct stages, normalization of the mantissas based on the exponents, followed by the actual addition, and then a post normalization of the result. See, generally, "Computer Organization and Architecture, Principles of Structure and Function", Second Edition, Macmillan Publishing Company, pages 276-283, and "Design of the IBM RISC System/6000 Floating Point Execution Unit", by R. K. Montoye et al., IBM Journal of Research and Development, Vol. 34, No. 1, January 1990, pages 59-70, for discussion on floating point arithmetic.

Further, difficulties are encountered when testing vertical line primitives using the brute force method. Vertical line primitives have an infinite slope, and simultaneous solving of equations becomes complicated since division by zero for the slope is required.

The Cohen-Sutherland (C-S) technique ("Computer Graphics—Principles and Practice" by Foley, et al., 1990 Addison Wesley Publishers, pp. 112-117) is another method of pick correlation. In the C-S method, depending on the location of the end-points of a line primitive with respect to the pick window, each of its end-points is assigned a particular four digit code, referred to as outcode. Referring now to FIG. 2, a rectangular pick window 20 is centered at the origin 0,0 of an x-y coordinate system. The area not within the pick window 20 is divided by dashed lines into eight different outer regions. Including the inner region of the pick window 20, there are a total of nine different regions that need to be considered in determining the location of an end-point of a line primitive. Each of these nine regions has a unique four bit outcode assigned thereto, and these region outcodes are used for comparing to the outcode of the end-points for determining the location of the end-point.

In accordance with the C-S method, each bit of the outcode of an end-point is chosen based on the coordinate value of the end-point. That is, if the y coordinate of the end-point is larger than $Y_{max}$, then the first bit of the outcode for the end-point is 1, otherwise the first bit is 0; if the y coordinate of the end-point is smaller than $Y_{min}$, then the second bit of the outcode for the end-point is 1, otherwise the second bit is 0; if the x coordinate of the end-point is larger than $x_{max}$, then the third bit of the outcode for the end-point is 1, otherwise the third bit is 0; and if the x coordinate of the end-point is smaller than $x_{min}$, then the fourth bit of the outcode for the end-point is 1, otherwise the fourth bit is 0; where $x_{max}$, $x_{min}$, $y_{max}$ and $y_{min}$ define the maximum and minimum x and y coordinates of the pick window 20 edges.

The outcodes of the end-points of a line primitive are compared with the outcodes assigned to each of the nine different regions. If both end-points of a line primitive have an outcode of 0000 then the line primitive is visible within the pick window 20, and the line primitive is trivially accepted. If both end-point outcodes of a line primitive has a bit with a value of 1 in an identical bit position, then both end-points are in one or more regions outside of the same extended edge of the pick window and the line primitive is trivially rejected. For example, if the first bit of both end-point outcodes has a value of 1, then it is known that the line primitive is in the region(s) outside of the extended upper edge of the pick window, and the line primitive can be trivially rejected. For all other cases, the line primitive may intersect at least one edge of the pick window 20. Additional steps and calculations must be performed for such a determination. In this regard, the outcode of an end-point in one of the outer regions is clipped against an edge of the pick window 20 using the brute force method to determine if there is an intersect point. If an intersect point is found, the portion of the line primitive from the intersect point to the subject outer end-point is rejected as being outside of the pick window 20, and this portion of the line primitive is disregarded by replacing the subject outer end-point with the intersect point, and the original line primitive is now replaced by a modified line primitive for further testing. The intersect point is then assigned an outcode, and the modified line primitive is subjected to the trivial test. If the modified line primitive cannot be trivially accepted or rejected using the trivial test, then one of its end-points which is in an outer region is chosen and replaced by a new intersect point for clipping with another pick window edge, again, using the brute force method, and thus, once another intersect point is found, the line primitive is again redefined and subjected to the trivial test. This process is reiterated, if required, until clipping with all pick window edges is completed.

The Cohen-Sutherland technique is considered to be an improvement for trivial testing of line primitives. However, for the line primitives that cannot be successfully tested using the trivial accept/reject criteria enunciated by Cohen-Sutherland, clipping of the line primitive using the brute force method is required before retesting with the trivial test, and the brute force method, as discussed above, undersirably requires solving simultaneous equations and performing numerous floating point multiplication and division operations. Compared to the basic brute force technique, the C-S method has reduced the number of line primitives which actually require the brute force method by allowing certain line primitives to be trivially accepted or rejected. However, using the C-S method, multiple clippings may be required for those line primitives which are subjected to the brute force method. Further, the C-S technique disadvantageously performs clipping operations in a fixed manner, oftentimes resulting in unneeded, extraneous clipping operations being performed.

Duvanenko et al. (Dr. Dobbs Journal, July, 1990, pp. 36-45, 98,100,) discloses a technique which attempts to speed up the Cohen-Sutherland method. In Duvanenko et al., calculation of the slope and inverted slope is performed only once per line primitive. Duvanenko et al. discloses optimizing the C-S method by omitting certain boundary or edge comparisons so that the total number of floating point operations is reduced. However, even with the reduction, the Duvanenko et al. method still requires a significant number of floating point operations to be performed.

Two additional methods are the Cyrus-Beck method and the Liang and Barsky method, "Computer Graphics—Principles and Practice", by Foley, et al., 1990 Addison Wesley Publishers, pp. 117-124. The Cyrus-Beck method implements a parametric line algorithm which finds the value of a parameter t in the parametric representation of the line primitive for the point at which that line primitive intersects the infinite line on which the clip pick window edge lies. Since all edges are somewhere intersected by the line primitive, four values of t can be calculated. A series of comparisons is then used to determine if any of the four values of t correspond to an "actual" intersection of the edge of the pick window. The coordinate values for the one or two actual intersections can then be calculated. Thus, the Cyrus-Beck method saves time as compared to the Cohen-Sutherland method in that the Cyrus-Beck approach avoids the repetitive looping needed to clip to multiple edges, and the actual calculation of the coordinates of the intersect points is postponed until needed. The Liang and Barsky method is considered to be an improvement over the Cyrus-Beck technique because the Cyrus-Beck technique examines each t value as it is generated, so that some line primitives can be rejected before all four t values have been computed. Although Cyrus-Beck and Liang and Barsky offer some degree of improvement, both of these methods still require numerous floating point multiplication and division operations to be performed.

The Nicholl et al. method as disclosed in "An Efficient New Algorithm for 2-D Line Clipping: Its Development and Analysis", ACM, Computer Graphics, Volume 21, Number 4, July 1987, pp. 253–262, uses an alternate approach to improve the non-trivial testing of the line primitives that cannot be tested by the Cohen-Sutherland method of trivial testing. The Nicholl et al. method involves dividing the two-dimensional space of the display screen by connecting a line from a selected end-point of the line primitive to each of the four corners of the pick window. By subdividing the plane into many regions, calculation of intersect points which are external to the pick window can be avoided. The Nicholl et al. method claims to speed up the non-trivial test, but it is complex to implement and requires performing many multiplication operations.

To summarize, it is a generally accepted that the Cohen-Sutherland technique is efficient for trivial testing, and alternate techniques are necessary to improve testing of line primitives that cannot be accepted or rejected using the Cohen-Sutherland trivial test.

The aforementioned methods generally attempt to achieve the goals of performing a minimum number of operations during testing so as to achieve speed, avoiding floating point calculations, particularly division calculations, and providing for simplified coding of the algorithm. However, none of these methods are able to achieve all of these goals. There is a clear need in graphic display for a line pick correlation method that can realize faster computations, fewer operations to test the lines and ease of coding.

OBJECTS OF THE INVENTION

An object of the present invention is to overcome deficiencies in prior art pick correlation methods.

Another object of the present invention is to more efficiently determine whether or not a line primitive is visible within a pick window.

A further object of the present invention is to increase the speed in determining whether or not a line primitive is visible within a pick window.

Still another object of the present invention is to perform pick correlation using minimal arithmetic operations, such as, multiplication, division and comparison operations.

Yet another object of the present invention is to perform pick correlation without requiring floating point operations.

A still further object of the present invention is to provide a method of pick correlation that is relatively simple to implement.

SUMMARY OF THE INVENTION

Generally, the present invention relates to a method of pick correlation using a pick marker which is displayed on a display screen. The pick marker is directed at an image on the display screen. The image comprises at least one line primitive, and the line primitive has end-point coordinates $x_1,y_1$ and $x_2,y_2$. The pick marker has, for example, a rectangular shaped pick window corresponding thereto, and the rectangular shaped pick window has a height of 2 h and a width of 2 w. The line primitive is subjected to a non-trival test to determine if the line primitive is visible within the pick window. The coordinates of the center of the rectangular shaped pick window is transformed to origin coordinates 0,0, and the end-point coordinates of the line primitive are transformed in accordance with and relative to the transformation of the coordinates of the center of the rectangular shaped pick window. A determination is then made to ascertain if the line primitive satisfies either the condition that $|h*dx+w*dy|>=|T|$ or the condition that $|h*dx-w*dy|>=|T|$, wherein $dx=x_1-x_2$; $dy=y_1-y_2$; and $T=x_1*y_2-y_1*x_2=y_1*dx-x_1*dy$. The line primitive is accepted as being visible within the pick window if the line primitive satisfies either of these conditions.

The line primitive can be subjected to a trivial test before being subjected to the non-trivial test. The trivial test is at least capable of testing the line primitive if the line primitive has both of its end-points outside of the same extended edge of the pick window. The trivial test can also be made capable of testing the line primitive if the line primitive has either one or both of its end-points visible within the pick window, or has both of its end-points in opposite outer, non-extended edge regions relative to the pick window.

BRIEF DESCRIPTION OF THE DRAWINGS

The objects, features and advantages of the invention will be apparent from the following more particular description of the invention as illustrated in the accompanying drawings, in which:

FIG. 6 shows a line primitive with negative slope intersecting the rectangular pick window of FIG. 4.

DETAILED DESCRIPTION OF THE INVENTION

Figure 3:
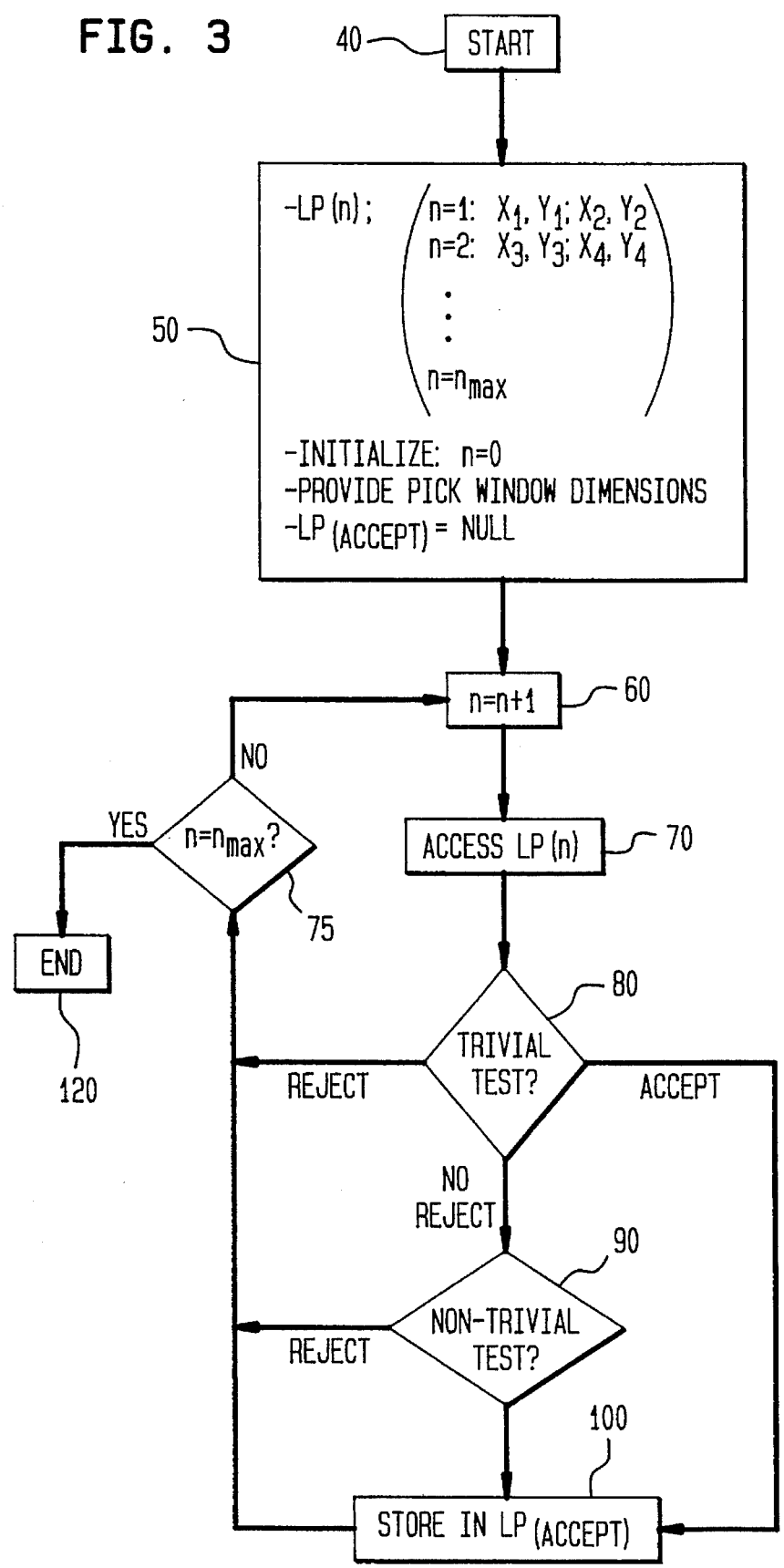
FIG. 3 shows a flowchart of pick correlation in accordance with the present invention.

Referring to FIG. 3, initiation begins at START block 40 when a user selects a displayed image on a display screen using a pick marker. The pick marker corresponds to a pick window. At block 50, a line primitive data set, LP(n), is provided. The line primitive data set LP(n) is a listing of x,y coordinate values. As discussed above, the images on a display screen are made up of a multitude of line primitives and the coordinate values in the line primitive data set LP(n) represent and correspond to the relative location of each end-point of each line primitive displayed on the screen at the time the object is selected, wherein $x_1$, $y_1$ and $x_2$, $y_2$ represent and correspond to the end-point coordinates of the first line primitive stored in the data set LP(n), $x_3$, $y_3$ and $x_4$, $y_4$ represent and correspond to the end-point coordinates of the second line primitive stored in the data set LP(n), and so forth, and $n_{max}$ is the the total number of line primitives displayed on the screen and stored in the line primitive data set (these values being equal). The variable n is used for tracking the sequential testing of the line primitives so that it can be determined when all line primitives have been tested, and it can be seen that for each n, there are two corresponding x-y locations, each x-y location representing an end-point of a line primitive. The variable n is initialized as zero at block 50 and incremented as each line primitive is tested for accessing the next line primitive for the next iteration. Testing is complete when n equals $n_{max}$.

Figure 4:
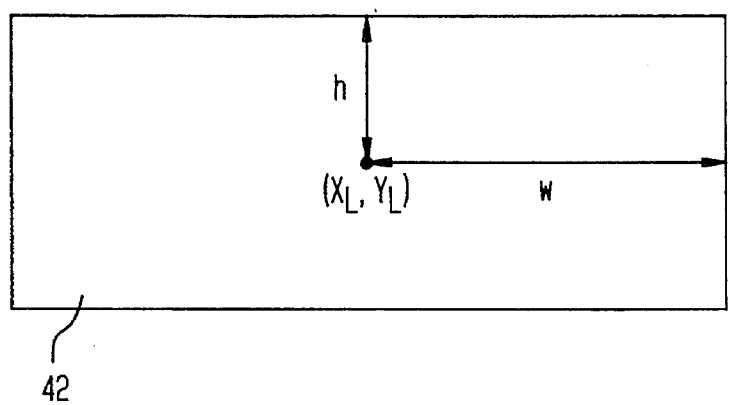
FIG. 4 shows a rectangular pick window.

Each line primitive must be tested to determine if it is visible within the pick window corresponding to the pick marker. Thus, at block 50, coordinates and dimensions of the pick window must also be provided. The particular dimensions that are required to be provided depends on the particular shape of the pick window being used. With reference to FIG. 4, a rectangular shaped pick window 42 is considered. For the rectangular pick window 42, the coordinates of its center, $x_L$, $y_L$, and the dimensions of its half-width, w, and its half-height, h, are required to be provided. Thus, the rectangular pick window 42 has a width of 2*w, and a height of 2*h.

Further, a data set, LP(accept), is defined at block 50 for storing all the line primitives that are determined as being visible within the pick window. LP(accept) is initialized at block 50 as being NULL.

The variable n is incremented at block 60, and the two end-point coordinates stored in the line primitive data set LP(n) corresponding to the next line primitive is accessed at block 70. In other words, blocks 60 and 70 allow for the line primitives to be accessed and tested sequentially in accordance with the order in which they are stored in the line primitive data set LP(n).

At block 80, a trivial test is conducted on the line primitive being tested. In accordance with the invention, at a minimum, the trivial test should be capable of testing (rejecting) line primitives which have both of its end-points in one or more regions outside of the same extended edge of the pick window. However, for increased efficiency, the trivial test at block 80 can include the capability of testing line primitives which have either one or both of its end-points visible within the pick window, or line primitives which have its end-points in opposite outer, non-extended, edge regions relative to the pick window. The methods used in such trival testing is explained in greater detail hereinbelow. It is preferred that the line primitives be subjected to a trivial test at block 80 before being subjected to the non-trivial test at block 90, because trivial testing is generally faster and more efficient than the non-trivial test. However, as discussed in the BACKGROUND OF THE INVENTION, trivial testing has limitations in that not all line primitives can be tested using a trivial test, and for these line primitives, the non-trivial test at block 90 needs to be implemented. The non-trivial test at block 90 is discussed in greater detail hereinbelow.

Figure 1:
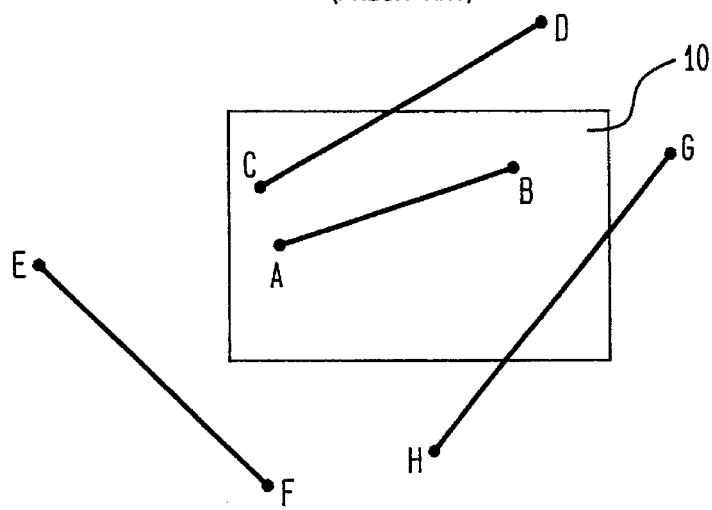
FIG. 1 shows various line primitives relative to a pick window.
Figure 2:
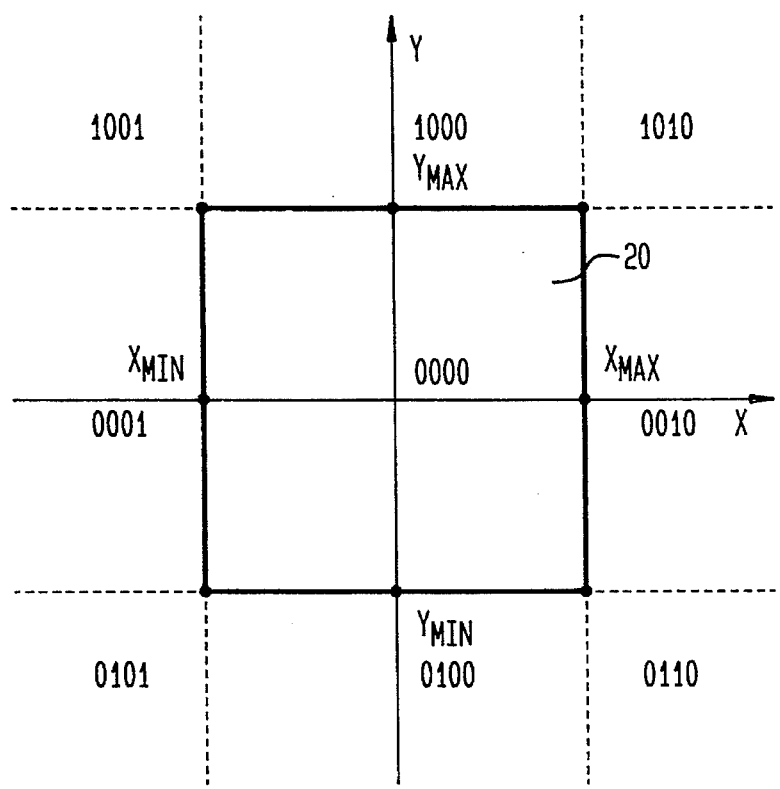
FIG. 2 illustrates the Cohen-Sutherland approach for accepting or rejecting line primitives.

In a preferred embodiment, an enhanced version of the Cohen-Sutherland (C-S) method described hereinabove in the BACKGROUND OF THE INVENTION is used at block 80 for trivially accepting or rejecting the line primitives. In accordance with the C-S method a four bit outcode is assigned to each of the end-points of the line primitive and the values of the end-point outcodes are compared with the outcodes assigned to the different regions. If one or both end-points have a 0000 outcode, this indicates that the line primitive is visible within the pick window, and the line primitive is trivially accepted. The enhancement to the C-S method comprises accepting the line primitive as being visible within the pick window when the logical inclusive OR of the line primitive end-point outcodes is equal to 1100 or 0011. As is apparent in FIG. 2, when the logical inclusive OR of the end-point outcodes equals 1100 or 0011, this indicates that the end-points of the line primitive are in opposite outer, non-extended, edge regions and the line primitive must therefore pass through the pick window. More specifically, if the line primitive has one of its end-points in the outer region with the assigned outcode 1000 and has its other end-point in the outer region with the assigned outcode 0100, then the logical inclusive OR of its end-point outcodes equals 1100, and it is apparent that the line primitive with such end-points must be visible within the pick window; and if the line primitive has one of its end-points in the outer region with the assigned outcode 0001 and has its other end-point in the outer region with the assigned outcode 0010, then the logical inclusive OR of its end-point outcodes equals 0011, and it is apparent that the line primitive with such end-points must be visible within the pick window. This enhancement effectively allows for testing more line primitives than does the basic Cohen-Sutherland method. As shown, if the line primitive is trivially accepted at block 80, then the line primitive is stored in the LP(accept) data set at block 100.

If the line primitive is trivially accepted at block 80 and stored at block 100, a determination is then made at block 75 to assess whether the line primitive tested was the last or final line primitive to be tested, i.e., whether the variable n is equal to $n_{max}$. If it was the last line primitive to be tested, then the testing ends a% block 120. However, if the line primitive was not the last to be tested, then the variable n is incremented at block 60 and the next line primitive is accessed at block 70, and tested continues.

As explained above, the line primitive is trivially rejected at block 80 if the trivial test determines that the outcodes of the line primitive have a value of 1 in identical outcode bit positions. This is an indication that both end-points of the line primitive are in one or more regions outside of the same extended edge of the pick window. If the line primitive is trivially rejected at block 80, the variable n is again tested at block 75 to determine if the last line primitive has been tested or if other line primitives need to be tested.

If the line primitive cannot be trivially accepted or rejected at block 80, i.e., no result can be ascertained as a result of the trivial test at block 80, then the line primitive is subjected to the non-trivial test at block 90.

The non-trivial test in accordance with the present invention is explained in more detail below, wherein the rectangular pick window 42 shown in FIG. 4 is still used as the specific example.

In accordance with the non-trivial test, a transformation is performed on the center of the pick window 42, and a corresponding transformation is performed on the end-points of the line primitive being tested. More specifically, the center of the pick window 42 is transformed so as to be at coordinates 0,0, and the end-point coordinates are correspondingly transformed relative to the center of the pick window being at 0,0. This is accomplished by subtracting the values of $x_L$, $y_L$ from the corresponding coordinate line primitive end-point values. Such transformation simplifies the resulting equations required in the non-trivial test.

Figure 5:
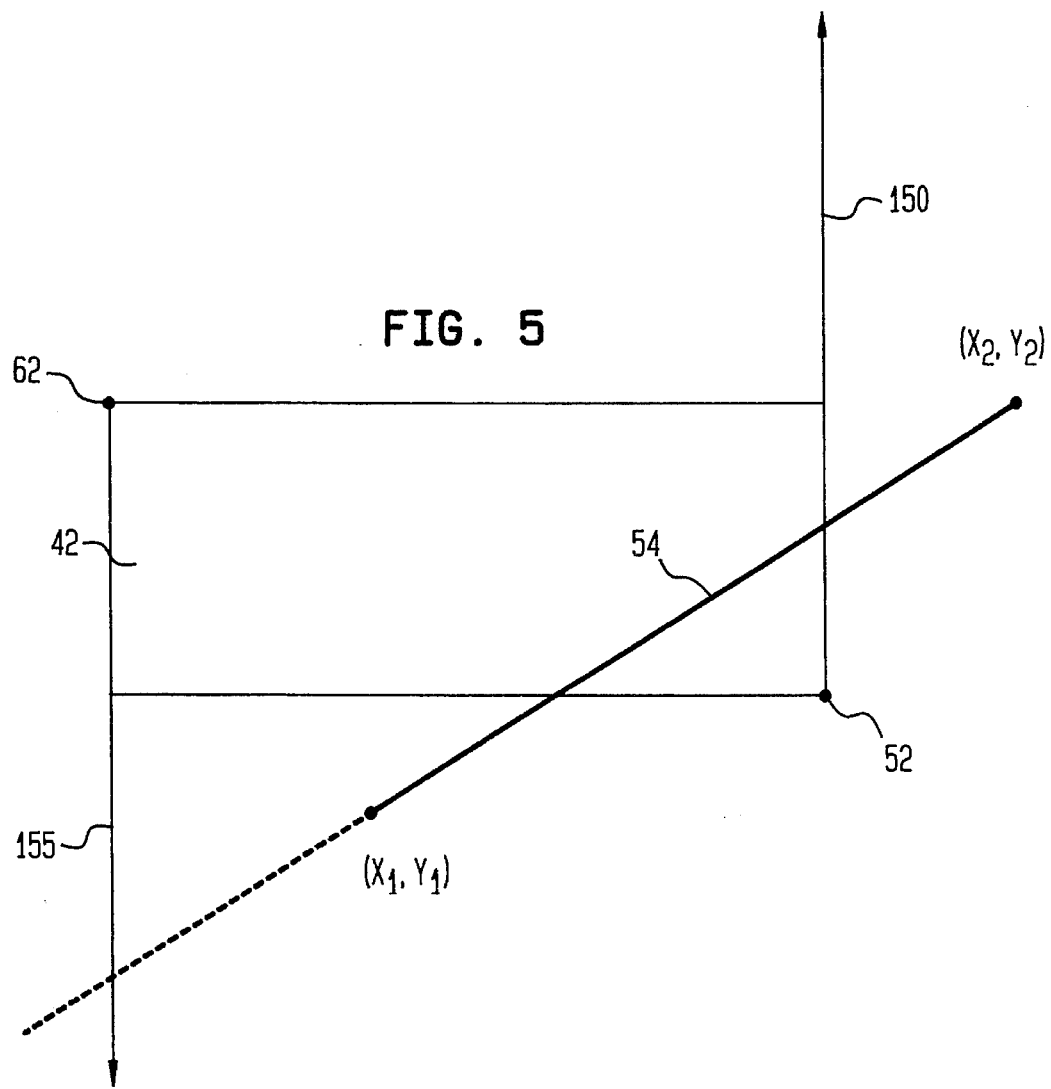
FIG. 5 shows a line primitive with positive slope intersecting the rectangular pick window of FIG. 4.

A non-trivial line primitive is considered selected or picked, if and only if, that line primitive crosses through or touches any part of the pick window 42. With this in mind, consider conditions that will insure that this has, or has not, happened. One such condition is illustrated in FIG. 5. As shown, a vector 150 extends upwardly beginning from the bottom right corner 52 of the pick window 42; and another vector 155 extends downwardly beginning from the top left corner 62 of the pick window 42. Both vectors 150 and 155 extend indefinitely in their respective directions. Further, a line primitive 54, having end-points located at coordinates $x_1, y_1$ and $x_2, y_2$ is also shown. Since the line primitive being tested is often only a line segment, it may need to be extended along its path in order to make the following observation hold true. In this regard, it is readily apparent that any non-trivial, extended, line primitive with positive slope, that crosses or touches the pick window 42, such as line primitive 54, must also cross both vectors 150 and 155, and vice versa. That is, if a line primitive crosses both vectors 150 and 155, then that line primitive must also cross, or at least touch, the pick window 42.

As demonstrated below, if equation (1) is true for line primitive 54, then the line primitive 54 will cross both vectors 150 and 155, and therefore must also cross or touch the pick window 42. It is important to note that equation (1) applies to all line primitives having positive slope.

$$|h*dx+w*dy| >= |T| \qquad (1)$$

where $dx=x_1-x_2$; $dy=y_1-y_2$; $T=x_1*y_2-y_1*x_2=y_1*dx-x_1*dy$; T is defined as the threshold value of the line primitive and is unique to each line primitive; and h is the half-height of the rectangular pick window, and w is the half-width of the rectangular pick window.

The equation for line primitives having negative slope is given in equation (2). With reference now to FIG. 6, a vector 160 extends upwardly beginning from the bottom left corner 64 of the pick window 42, and a vector 165 extends downwardly beginning from the top right corner 72 of the pick window 42. Similar to the situation outlined above with the line primitive 54 having a positive slope, it is apparent that the line primitive with negative slope will cross or at least touch the pick window 42, if and only if, the extended line primitive 74 crosses both vectors 160 and 165.

Thus, if equation (2) holds true for the line primitive 74, then the line primitive 74 will cross both vectors 160 and 165, and therefore must also cross or touch the pick window 42. It should be noted that equation (2) applies to all line primitives having negative slope.

$$|h*dx-w*dy| >= |T| \qquad (2)$$

where dx, dy, T, h and w are the same as defined above for equation (1).

Therefore, it can be concluded that for the non-trivial test at block 90, if a line primitive satisfies either equation (1) or equation (2), then the line primitive is visible within the pick window 42, and the line primitive is picked and added to the LP(accept) data set at block 100. But if the line primitive does not satisfy either equation (1) or equation (2), then the line primitive is not visible within the pick window 42, and the line primitive is not picked. The non-trivial test at block 90 can be outlined or defined as follows:

```
IF
    {|h*dx + w*dy| >= |T|}
        OR
    {|h*dx - w*dy| >= |T|}
THEN
    PICK
ELSE
    NO PICK
ENDIF
```

Advantageously, the prior art techniques of testing against all four edges of a rectangular pick window has now been simplified and replaced by testing against two semi-infinite parallel lines, or vectors, which results in the simpler test criteria of the present invention.

Referring again to FIG. 5, equation (1) can be derived by considering the condition under which the line primitive 54 will cross vector 150, and then the condition under which the line primitive 54 will cross vector 155. The representation of the line primitive is given by the following equation:

$$y=m*(x-x_1)+y_1$$

where m is the slope of the line primitive 54, and $x_1,y_1$ can be any point on the line primitive 54, which is, in this case, for example, an end-point of the line primitive 54. The line primitive 54 will cross the vector 150 only if:

$$h>=-y, \text{ for } x=w$$

or . . .

$$h>=-y=-m*(w-x_1)-y_1$$

$$h>=-y=-(dy/dx)*(w-x_1)-y_1,$$

where $dy=y_1-y_2$, $dx=x_1-x_2$.

Assume for the moment that dx>0, and multiplying both sides by dx results in the following:

$$h*dx>=-y*dx=-dy*(w-x_1)-y_1*dx$$

$$h*dx>=-y*dx=-dy*w+dy*x_1-y_1*dx$$

$$h*dx+w*dy>=dy*x_1-y_1*dx=-T=-(y_1-*dx-X_1*dy)$$

$$h*dx+w*dy>=-T, \text{ for } dx>0$$

Now, assuming that dx<0, the following equation can be derived in the same manner as above:

$$-(h*dx+w*dy)>=T, \text{ for } dx>0.$$

Therefore, for a line primitive crossing vector 150, the following is true:

$$h*dx+w*dy>=-T, \text{ for } dx>0 \qquad (3)$$

$$-(h*dx+w*dy)>=T, \text{ for } dx<0 \qquad (4)$$

In the same manner, the following can be derived for a line primitive crossing vector 155:

$$h*dx+w*dy>=T, \text{ for } dx>0 \qquad (5)$$

$$-(h*dx+w*dy)>=-T, \text{ for } dx<0 \qquad (6)$$

In order for a line primitive to cross both vectors 150 and 155, equations (3) and (5) must be true for dx>0, or equations (4) and (6) must be true for dx<0.

However, if equations (3) and (5) are true, then that would imply the following:

$$h*dx+w*dy>=|T|, \text{ for } dx>0$$

Which further implies the following:

$$|h*dx+w*dy|>=|T|, \text{ for } dx>0 \qquad (7)$$

And, if equations (4) and (6) are true, then that would imply the following:

$$-(h*dx+w*dy)>=|T|, \text{ for } dx<0$$

Again:

$$|h*dx+w*dy|>=|T|, \text{ for } dx<0 \qquad (8)$$

So, if equation (7) OR equation (8) is true for a line primitive, then that line primitive will cross both vector 150 and vector 155. Thus, the line primitive would be picked. Therefore, "equation (7) OR equation (8)" implies the following:

$$|h*dx+w*dy|>=|T|, \text{ for all non-zero } dx \text{ and } dy \quad (9)$$

Equation (9) is the same as equation (1), and thus the derivation of equation (1) is complete.

If equation (1) is satisfied, then the line primitive is picked. However, if equation (1) is not satisfied, it cannot be inferred that there is no pick. As is apparent in FIG. 6, certain line primitives with negative slope will not satisfy equation (1) and still be visible within the pick window 42. Thus, equation (2) is also required to complete the determination.

Equation (2) is derived in the similar manner as equation (1). The proof that vectors 150, 155, 160, and 165, are necessary and sufficient to define a complete pick correlation test, is accomplished by exhaustively examining all possible cases of "pick" and "no pick".

Referring again to FIG. 6, equation (2) can be derived by considering the condition under which the line primitive 74 will cross vector 160, and then the condition under which the line primitive 74 will cross vector 165. The representation of the line primitive 74 is given by the following equation:

$$y=m*(x-x_3)+y_3$$

where m is the slope of the line primitive 74, and $x_3,y_3$ can be any point on the line primitive 74, which is, in the case, for example, an end-point of the line primitive 74. The line primitive 74 will cross the vector 160 only if:

$$h>=-y, \text{ for } x=-w$$

or . . .

$$h>=-y=-m*(-w-x_3)-y_3$$

$$h>=-y=-(dy/dx)*(-w-x_3)-y_3,$$

where $dy=y_3-y_4$, $dx=x_3-x_4$.

Assume for the moment that dx>0, and multiply both sides by dx results in the following:

$$h*dx>=-y*dx=-dy*(-w-x_3)-y_3*dx$$

$$h*dx>=-y*dx=dy*w+dy*x_3-y_3*dx$$

$$h*dx-w*dy>=dy*x_3y_3*dx=-T=-(y_3,dx-x_3*dy)$$

$$h*dx-w*dy>=-T, \text{ for } dx>0.$$

Now, assuming that dx<0, the following equation can be derived in the same manner as above:

$$-(h*dx-dy*w)>=T, \text{ for } dx<0.$$

Therefore, for a line primitive crossing vector 160, the following is true:

$$h*dx-w*dy>=-T, \text{ for } dx>0 \quad (10)$$

$$-(h*dx-w*dy)>=T, \text{ for } dx<0. \quad (11)$$

In the same manner, the following can be derived for a line primitive crossing vector 165:

$$h*dx-w*dy>=T, \text{ for } dx>0 \quad (12)$$

$$-(h*dx-w*dy)>=-T, \text{ for } dx<0. \quad (13)$$

In order for a line primitive to cross both vectors 160 and 165, equations (10) and (12) must be true for dx>0, or equations (11) and (13) must be true for dx<0.

However, if equations (10) and (12) are true, then that would imply the following:

$$h*dx-w*dy>=|T|, \text{ for } dx>0$$

which further implies the following:

$$|h*dx-w*dy|>=|T|, \text{ for } dx>0. \quad (14)$$

Also, if equations (11) and (13) are true, then that would imply the following:

$$-(h*dx-w*dy)>=|T|, \text{ for } dx<0.$$

Again:

$$|h*dx-w*dy|>=|T|, \text{ for } dx<0. \quad (15)$$

So, if equation (14) OR (15) is true for a line primitive, then that line primitive will cross both vector 160 and vector 165. Thus, the line primitive would be picked. Therefore, "equation (17) OR equation (18)" implies the following:

$$|h*dx-w*dy|>=|T|, \text{ for all non-zero dx and dy.} \quad (16)$$

Equation (16) is the same as equation (2), and thus the derivation of equation (2) is complete. The derivation for the non-trivial test at block 90 is also now complete.

It is also noted that equations (9) and (16) are able to correctly pick line primitives having zero slope, infinite slope and degenerate characteristics (for example, a line primitive made up of only one point). Thus, the equations can be written as follows:

$$|h*dx+w*dy|>=|T|, \text{ for all dx and dy}$$

$$|h*dx-w*dy|>=|T|, \text{ for all dx and dy.}$$

Note, that when w=h, the rectangular pick window becomes a square. This is a specific case of the more general case of the rectangle. However, depending on the application, the specific case of the square pick window can allow for implementation simplifications and optimizations. More specifically, in the specific case of the square, the equations for the non-trivial test in accordance with the present invention can be simplified to the following equations:

$$|w(dx+dy)|>=|T|, \text{ for all dx and dy}$$

$$|w(dx-dy)|>=|T|, \text{ for all dx and dy.}$$

Advantages of the present invention over alternate methods described hereinabove can be illustrated by comparing the number of different mathematical operations required in performing a non-trivial test for a line primitive. This is shown in Table 1 below, which compares the non-trivial test of the present invention with a typical brute force method and the Cohen-Sutherland (C-S) method. Particularly note that the present invention requires fewer total operations; and the operations that are required are the simpler to implement non-floating point operations, as compared to the complex, time-consuming floating point operations required in the other methods.

TABLE 1

| Operation | Brute Force | C-S Method | Present Invention |
| --- | --- | --- | --- |
| Non-Floating Point: | | | |
| Absolute Value | 0 | 0 | 3 |
| Comparisons | 0 | 0 | 2 |
| Subtraction | 0 | 0 | 6 |

TABLE 1-continued

| Operation | Brute Force | C-S Method | Present Invention |
|---|---|---|---|
| Addition | 0 | 0 | 1 |
| Multiplication | 0 | 0 | 4 |
| Division | 0 | 0 | 0 |
| TOTALS Floating Point: | 0 | 0 | 16 |
| Absolute Value | 4 | 4 | 0 |
| Comparisons | 16 | 4 | 0 |
| Subtraction | 10 | 8 | 0 |
| Addition | 4 | 8 | 0 |
| Multiplication | 4 | 4 | 0 |
| Division | 2 | 2 | 0 |
| TOTALS | 40 | 26 | 0 |

While the invention has been described in terms of specific embodiments, it is evident in view of the foregoing description that numerous alternatives, modifications and variations will be apparent to those skilled in the art. Thus, the invention is intended to encompass all such alternatives, modifications and variations which fall within the scope and spirit of the invention and the appended claims.

What is claimed is:

1. In a computer graphics system, a method of selecting an object from a plurality of objects displayed on a computer graphics display in response to a user initiated pick selection, each of said plurality of objects comprising at least one line primitive having end-point coordinates, said method comprising the steps of:

(a) displaying a pick marker in a first position on said computer graphics display of said computer graphics system, said pick marker having a rectangular shaped pick window corresponding thereto;

(b) providing an input device for controlling movement of said pick marker within said computer graphics display;

(c) manipulating said input device for repositioning said pick marker to a second position within said computer graphics display, such that said pick marker is directed at a selected one of said plurality of objects displayed on said computer graphics display;

(d) inputting with said input device a signal effectuating selection of said selected object, wherein the selection is determined according to the steps of:
    subjecting each line primitive of each object displayed on said computer graphics display to a trivial test, whereby said trivial test is capable of testing line primitives having both end-points outside of the same extended edge of said rectangular shaped pick window, and accepting or rejecting line primitives in accordance with the results of said trivial test;
    subjecting line primitives which are incapable of being tested by said trivial test to a non-trivial test, said non-trivial test comprising the steps of transforming the coordinates of said rectangular shaped pick window such that its center is at the origin coordinates and transforming the coordinates of the line primitive in accordance with and relative to the transformed coordinates of said rectangular shaped pick window, comparing a threshold value based on end-point coordinates of the line primitive with a product-sum based on the height and width of said rectangular shaped pick window and end-point coordinates of the line primitive, and accepting the line primitive if the threshold value is less than or equal to the product-sum; and (e) subjecting the object corresponding to line primitives accepted during said trivial or non-trivial test to further computer processing.

2. A method according to claim 1, wherein said trivial test in step (d) is further capable of testing said at least one line primitive if said at least one line primitive has either one or both of its end-points visible within said rectangular shaped pick window, or has its end-points in opposite outer, non-extended edge regions relative to said rectangular shaped pick window.

3. A method according to claim 2, wherein said trivial test in step (d) comprises an enhanced version of the Cohen-Sutherland test.

4. A method according to claim 3, wherein said non-trivial test in step (d) includes the step of determining if the line primitive satisfies either the condition that $|h*dx+w*dy| >= |T|$ or the condition that $|h*dx-w*dy| >= |T|$, wherein $x_1$, $y_1$ and $x_2$, $y_2$ are end-point coordinates of the line primitive; T is the threshold value; $dx=x_1-x_2$; $dy=y_1-y_2$; and $T=x_1*y_2-y_1*x_2=y_1*dx-x_1*dy$; wherein the line primitive is accepted if the line primitive satisfies either of said conditions.

5. A method according to claim 1, wherein said trivial test in step (d) comprises the Cohen-Sutherland test.

6. A method according to claim 5, wherein said non-trivial test in step (d) includes the step of determining if the line primitive satisfies either the condition that $|h*dx+w*dy| >= |T|$ or the condition that $|h*dx-w*dy| >= |T|$, wherein $x_1$, $y_1$ and $x_2$, $y_2$ are end-point coordinates of the line primitive; T is the threshold value; $dx=x_1-x_2$; $dy=y_1-y_2$; and $T=x_1*y_2-y_1*x_2=y_1*dx-x_1*dy$; wherein the line primitive is accepted if the line primitive satisfies either of said conditions.

7. A method according to claim 1, wherein said non-trivial test in step (d) includes the step of; determining if the line primitive satisfies either the condition that $|h*dx+w*dy| >= |T|$ or the condition that $|h*dx-w*dy| >= |T|$, wherein $x_1$, $y_1$ and $x_2$, $y_2$ are end-point coordinates of the line primitive; T is the threshold value; $dx=x_1-x_2$; $dy=y_1-y_2$; and $T=x_1*y_2-y_1*x_2=y_1*dx-x_1*dy$; wherein the line primitive is accepted if the line primitive satisfies either of said conditions.

* * * * *